US012600193B2

(12) United States Patent
Rodriguez et al.

(10) Patent No.: US 12,600,193 B2
(45) Date of Patent: Apr. 14, 2026

(54) SYSTEM AND METHOD FOR PROVIDING RACE PREPARATION MODES ON BATTERY ELECTRIC VEHICLE

(71) Applicant: FCA US LLC, Auburn Hills, MI (US)

(72) Inventors: Paul E. Rodriguez, White Lake, MI (US); Jeremy J. Anker, Lake Orion, MI (US); Sean King, Macomb Township, MI (US); Dean Baker, Rochester Hills, MI (US); Jon Strunk, Rochester Hills, MI (US); Allison Singer, Oxford, MI (US); Jason Trombley, Imlay City, MI (US); David Carr, Brighton, MI (US); Haley Lee, Rochester Hills, MI (US); Kanishk Bakshi, Farmington Hills, MI (US); Mark Platt, Van Buren Township, MI (US); Brian Driscoll, New Hudson, MI (US); Joe Nissen, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 135 days.

(21) Appl. No.: 18/499,385

(22) Filed: Nov. 1, 2023

(65) Prior Publication Data

US 2025/0135833 A1 May 1, 2025

(51) Int. Cl.
B60H 1/00 (2006.01)
B60L 58/26 (2019.01)
B60L 58/27 (2019.01)

(52) U.S. Cl.
CPC ..... B60H 1/00278 (2013.01); B60H 1/00878 (2013.01); B60L 58/26 (2019.02);
(Continued)

(58) Field of Classification Search
CPC ...... B60L 58/26; B60L 58/27; B60L 2260/00; B60L 2260/20
See application file for complete search history.

(56) References Cited

U.S. PATENT DOCUMENTS 5,490,572 A * 2/1996 Tajiri ........................ B60L 1/02
180/68.5
2017/0136914 A1* 5/2017 Drake ..................... B60L 58/21
(Continued)

OTHER PUBLICATIONS

International Search Report and Written Opinion dated Feb. 10, 2025 for International Application No. PCT/US2024/053842, International Filing Date Oct. 31, 2024.
(Continued)

*Primary Examiner* — Aaron L Troost
(74) *Attorney, Agent, or Firm* — Jeremy J. Klobucar

(57) ABSTRACT

A vehicle system for an electrified vehicle that implements a race preparation mode for preparing the electrified vehicle for a race event is provided. The vehicle system includes a motor, a battery system, an instrument panel cluster and a controller. The controller initiates the race preparation mode based on user selection of the race preparation mode. The controller determines whether a drag race mode is selected and determines whether a measured temperature of the battery system is below a warm temperature threshold. The temperature of the battery system is elevated based on the measured temperature being below the warm temperature threshold. The controller determines whether a track mode is selected and determines whether a measured temperature of the battery system is above a cold temperature threshold. The temperature of the battery system is reduced based on the measured temperature being above the cold temperature threshold.

16 Claims, 4 Drawing Sheets

(52) U.S. Cl.
CPC ........ *B60L 58/27* (2019.02); *B60H 2001/003*
(2013.01); *B60L 2240/545* (2013.01)

(56) References Cited

U.S. PATENT DOCUMENTS

| | | | |
|---|---|---|---|
| 2023/0382256 A1* | 11/2023 | Tuukkanen | H02J 7/0048 |
| 2024/0351475 A1* | 10/2024 | Poloni | B60L 58/27 |
| 2025/0083570 A1* | 3/2025 | Ashraf | B60L 58/27 |

OTHER PUBLICATIONS

Tesla Inc.: "Model S Owners Manual: Acceleration Modes", Oct. 31, 2021 (Oct. 31, 2021), pp. 1-4, XP093244709, Retrieved from the Internet: URL:https://web.archive.org/web/202111031140543/ https://www.teslaqa.com/ownersmanual/2012_2020_models/en_eu/ GUID-E692415D-F83C-4F 07-B30A-9E50499CFC30.html p. 1-2.

* cited by examiner

SYSTEM AND METHOD FOR PROVIDING RACE PREPARATION MODES ON BATTERY ELECTRIC VEHICLE

FIELD

The present disclosure relates generally to a system and method for providing race preparation modes on a battery electric vehicle.

BACKGROUND

In recent years electrified vehicles have been participating in racing events on closed track environments. Popular racing events can include long races such as on a track for extended periods, or short races for short periods of time such as along a drag strip. Electrified vehicles present different challenges as compared to traditional internal combustion engine vehicles. As electrified vehicles are powered by battery systems, it is desirable to harness the highest amount of power from the battery based on race circumstances. As a track event tends to heat the battery up, the battery may not be able to supply the energy to maintain acceleration events over long periods. In this regard, a cool battery may be desirable to start a long track race. Conversely, for a short race or drag event, it can be desirable to raise the temperature of the battery system as the burst of energy requirements are shorter in duration for a drag event. In this regard, there remains a need for improvement in the relevant art.

SUMMARY

In one example aspect of the invention, a vehicle system for an electrified vehicle that implements a race preparation mode for preparing the electrified vehicle for a race event is provided. The vehicle system includes a motor, a battery system, an instrument panel cluster and a controller. The motor provides drive torque to drive wheels for propelling the vehicle. The battery system stores and delivers power to the motor. The instrument panel cluster is configured to display a user interface menu that includes a user selectable race preparation mode. The controller initiates the race preparation mode based on user selection of the race preparation mode. The race preparation mode includes a drag race mode and a track mode. The controller determines whether the drag race mode is selected and determines whether a measured temperature of the battery system is below a warm temperature threshold. The temperature of the battery system is elevated based on the measured temperature being below the warm temperature threshold. The controller determines whether the track mode is selected and determines whether a measured temperature of the battery system is above a cold temperature threshold. The temperature of the battery system is reduced based on the measured temperature being above the cold temperature threshold.

In examples, the vehicle system further comprises a heating cooling and air conditioning (HVAC) system that selectively provides one of heating and cooling to the vehicle system, wherein the controller communicates a signal to the HVAC system to warm the battery system based on a determination that the measured temperature of the battery system is below the warm temperature threshold.

In other examples, the vehicle system further comprises a heating cooling and air conditioning (HVAC) system that selectively provides one of heating and cooling to the vehicle system, wherein the controller communicates a signal to the HVAC system to cool the battery system based on a determination that the measured temperature of the battery system is above the cold temperature threshold.

In other examples, the vehicle system further comprises a fan configured to cool the battery system, wherein the controller communicates a signal to the fan to cool the battery system based on a determination that the measured temperature of the battery system is above the cold temperature threshold.

In other examples, the controller communicates a signal to the user interface menu to charge the battery system based on a determination that the measured temperature of the battery system is below the warm temperature threshold.

In other examples, the controller communicates a signal to the user interface menu that displays target charge and thermal parameters.

In other examples, the controller communicates a signal to the user interface menu that displays a time to ready indicative of a time needed to reach a desired temperature of the battery system.

In other examples, a method for implementing a race preparation mode to prepare an electrified vehicle for a race event, is provided. The electrified vehicle includes a user interface panel and a battery system that powers an electric motor. The method includes determining that a race preparation mode has been selected, the race preparation mode including a drag race mode and a track mode; determining whether the drag race mode is selected; determining, based on the drag race mode being selected, whether a measured temperature of the battery system is below a warm temperature threshold; elevating a temperature of the battery system based on the measured temperature being below the warm temperature threshold; determining whether the track mode is selected; determining, based on the track mode being selected, whether a measured temperature of the battery system is below a cold temperature threshold; and reducing a temperature of the battery system based on the measured temperature being above a cold temperature threshold.

In other features, the electrified vehicle further comprises a heating cooling and air conditioning (HVAC) system that selectively provides one of heating and cooling to the vehicle system, wherein the method further comprises: communicating a signal to the HVAC system to warm the battery system based on a determination that the measured temperature of the battery system is below the warm temperature threshold.

In additional features, the electrified vehicle further comprises a heating cooling and air conditioning (HVAC) system that selectively provides one of heating and cooling to the vehicle system, wherein the method further comprises: communicating a signal to the HVAC system to cool the battery system based on a determination that the measured temperature of the battery system is above the cold temperature threshold.

In other features, the electrified vehicle further includes a fan configured to cool the battery system, wherein the method further comprises: communicating a signal to the fan to cool the battery system based on a determination that the measured temperature of the battery system is above the cold temperature threshold.

In other features the method comprises: communicating a signal to the user interface menu to charge the battery system based on a determination that the measured temperature of the battery system is below the warm temperature threshold; communicating a signal to the user interface menu that displays target charge and thermal parameters; and communicating a signal to the user interface menu that displays a time to ready indicative of a time needed to reach a desired temperature of the battery system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
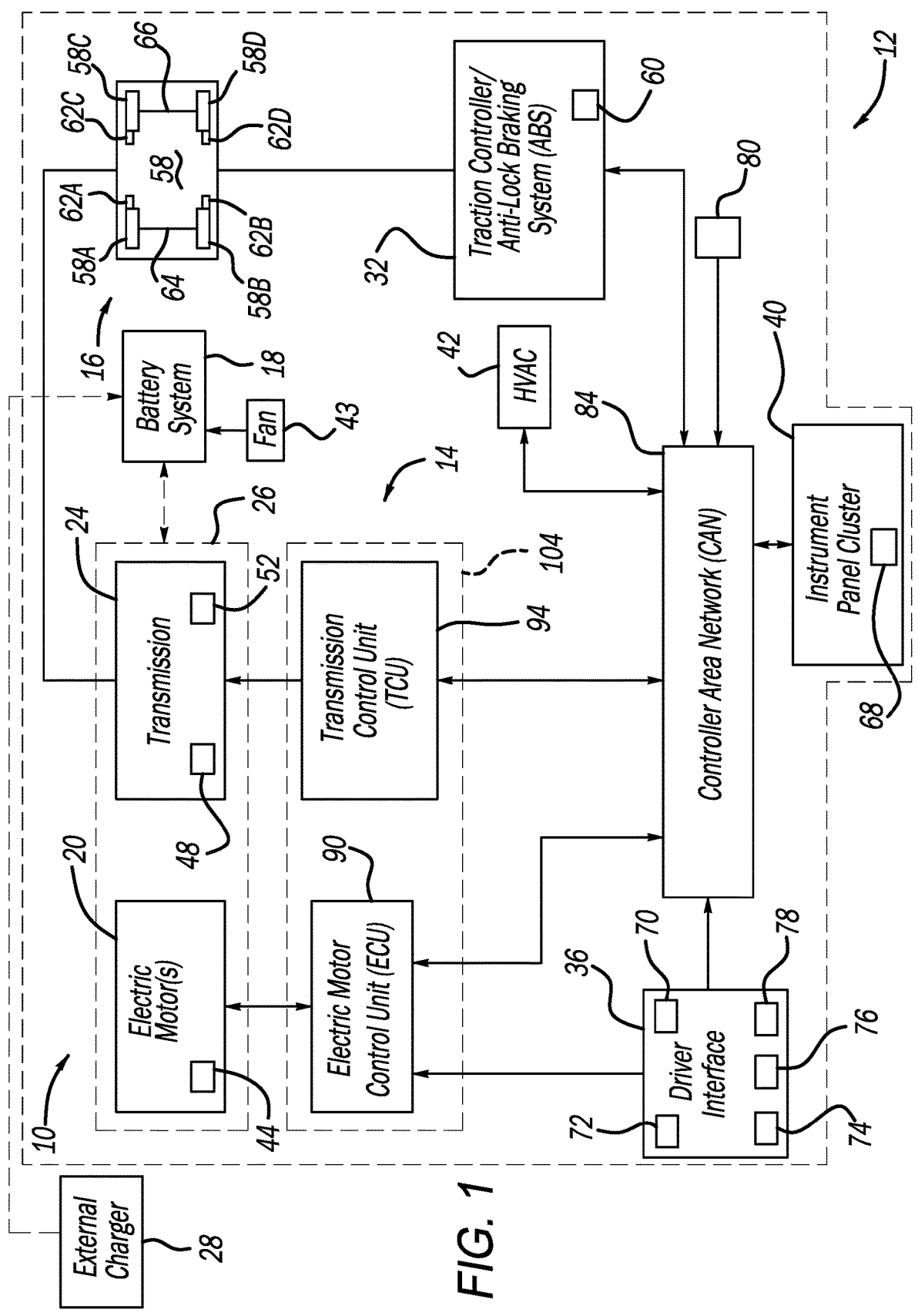
FIG. 1 is a schematic block diagram of an exemplary vehicle system according to the principles of the present disclosure.

With initial reference to FIG. 1, an exemplary vehicle system is schematically shown and generally identified at reference numeral 10. In accordance with various aspects of the present disclosure, interactive techniques, referred to herein as a "race preparation mode" for permitting an exemplary vehicle 14 to perform race preparation events are implemented utilizing the vehicle system 10. As will be discussed in greater detail below, in one example implementation the interactive race preparation mode is initiated upon a vehicle driver selecting a race preparation mode from an interactive menu displayed on an instrument cluster of the vehicle system. The race preparation mode can only be entered based on satisfying a number of vehicle conditions.

With continuing reference to FIG. 1, the exemplary vehicle system 10 is associated with an exemplary electrified vehicle 12 and includes an electrified powertrain 14 configured to transfer drive torque to a driveline 16 of the vehicle 14 for propulsion. The electrified powertrain 14 generally comprises a high voltage battery system 18, one or more electric motors 20, and a transmission 24. The one or more electric motors 20 and the transmission 24 can be collectively referred to herein as an electric drive module 26. While the exemplary implementation includes a transmission 24, in some examples the electrified powertrain 14 does not include a transmission. The battery system 18 is selectively connectable (e.g., by the driver) to an external charging system 28 (also referred to herein as "charger 28") for charging of the battery system 18.

The vehicle system 10 further includes a traction controller and/or an anti-lock brake system (ABS) 32. While shown together it will be appreciated that the vehicle system 10 can have a dedicated traction control system that operates independent of an anti-lock brake system. The vehicle system 10 further includes a driver interface 36 and an instrument panel or cluster 40. The instrument panel or cluster 40 can include any interface device, such as a driver information center and/or vehicle infotainment system capable of receiving input from a driver.

The vehicle system 10 additionally comprises a heating, venting and air conditioning (HVAC) system 42. The HVAC system 42 can be operated to cool the cabin of the vehicle 12 and/or specific components of the vehicle system 10. As will become appreciated herein, the HVAC system 42 can be configured as a cooling input to the battery system 18 to cool the battery system 18 to prepare the vehicle 12 for a long race or track event. As a track event tends to heat the battery system 18 up it is not able to supply the energy to maintain acceleration events. By starting the track event with the battery system 18 at a colder temperature, the battery system 18 has a longer time associated with heat up therefore allowing the driver to stay for longer durations on the track before thermal deterioration occurs.

Conversely, in other race preparation, such as a short race or drag event, it can be desirable to raise the temperature of the battery system 18. In a drag race event, the burst of energy requirements are shorter in duration. For these shorter events, the optimum battery energy output sometimes occurs with a warmer battery. In these circumstances, the HVAC system 42 can be used to elevate the battery system 18. Additionally or alternatively, the temperature of the battery system 18 can be elevated with a charge event by charging the battery system 18 with the external charger 28. In additional examples, the vehicle system can include fans 43 integral to the battery system 18 or externally arranged relative to the battery system 18. As will be described herein, the fans 43 can be used to cool the battery system 18 such as during a track preparation event.

The electric motor 20 includes an engine speed sensor 44. The transmission 24 includes various transmission speed sensors, such as input and output transmission shaft speed sensors 48 and various shift sensors 52, to provide a signal to an associated control system indicative of a transmission gear selected. The transmission 24 and traction controller 32 are coupled or selectively coupled, directly or indirectly, to one or more wheels 58 of vehicle 12, as is known in the art. In the exemplary vehicle system, all of the wheels 58 are drive wheels that receive torque input. While the motor 20 is described herein as an electric motor, in other examples, the vehicle system 10 can be configured with a conventional internal combustion engine (ICE), or a hybrid electric vehicle.

The wheels 58 are identified individually as front wheels 58A, 58B and rear wheels 58C, 58D. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. In the exemplary implementation illustrated, the traction controller 32 is controlled to activate foundation brakes 60.

The instrument panel cluster 40 includes various indicators, such as a race preparation mode activation light or indicator 68. As will be described herein with respect to FIGS. 2A-2C, the instrument panel cluster 40 provides a menu driven sequence to the driver to enable race preparation mode. The driver interface 36 includes a steering wheel 70 and a brake pedal 72. The driver interface 36 includes a driver input device, e.g., an accelerator pedal 74, for providing a driver input, e.g., a torque request, for the motor 20. The driver interface 36 can further include a park brake 76. The driver interface 36 or vehicle interior also includes a transmission shift request device, such as a shift lever or rotary shifter 78, for the driver to request a desired gear of the transmission 24. The shift lever or rotary shifter 78 can provide conventional transmission options including park, reverse, neutral, drive and low. In examples, the race preparation mode is only activated when the rotary shifter 78 is in park. The vehicle system 10 also includes sensors 80. The sensors 80 can include one or more temperature sensors that sense a temperature of the battery system 18 and/or other components of the vehicle system 10. In additional examples, the sensors 80 can include an ambient temperature sensor.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes an electric motor control unit (ECU) 90 for controlling the motor 20, and a transmission control unit (TCU) 94 for controlling the transmission 24. Both of the control units 90 and 94 as well as the traction controller 32, driver interface 36, instrument cluster 40 and sensor 80 are in communication with CAN 84 and thus each other. Again, in some examples a transmission 24 and therefore the TCU 94 is not included. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Figure 2A:
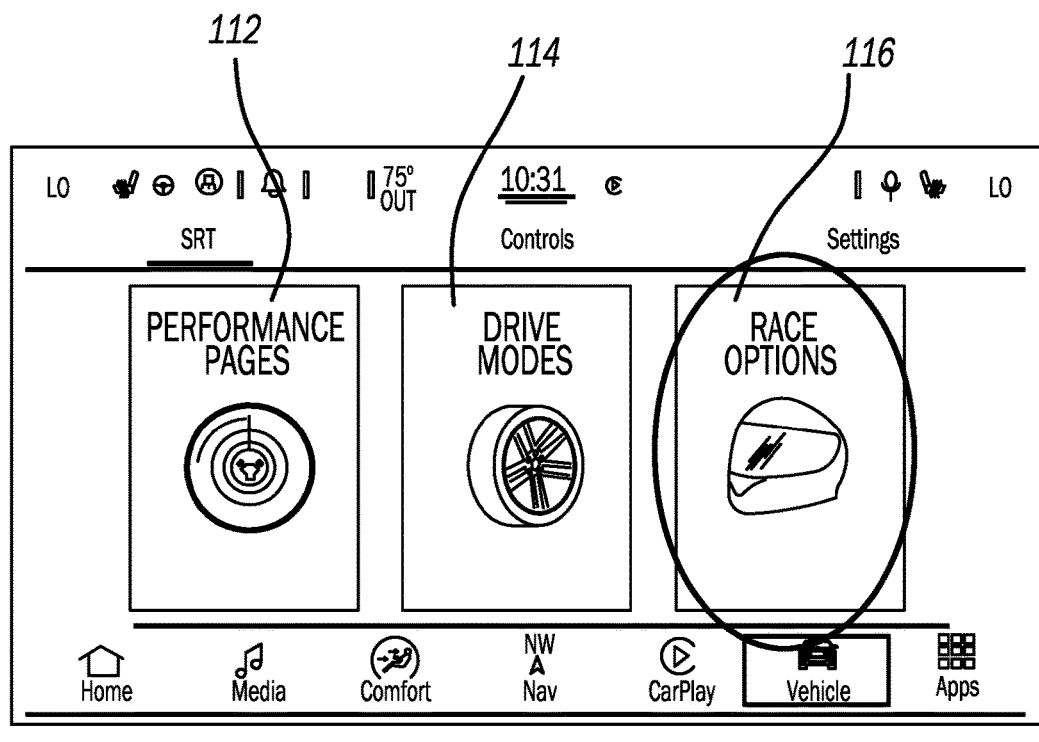
FIGS. 2A-2C are exemplary menu interfaces provided on the instrument panel cluster of the vehicle system of FIG. 1 for entering race preparation mode according to the principles of the present disclosure.
Figure 2B:
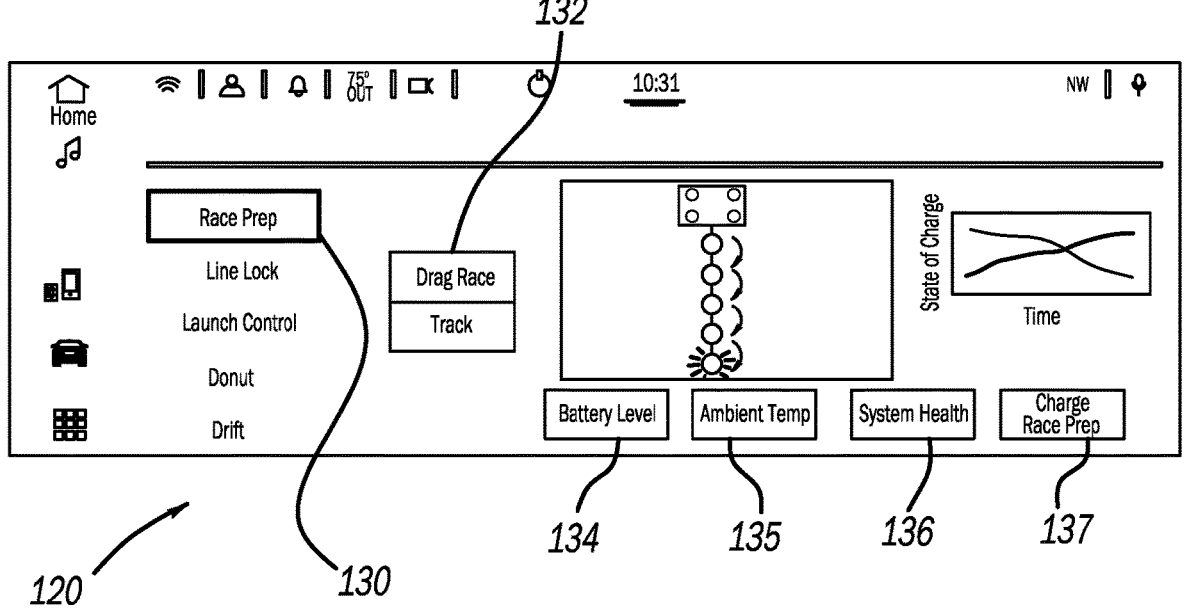
Figure 2C:
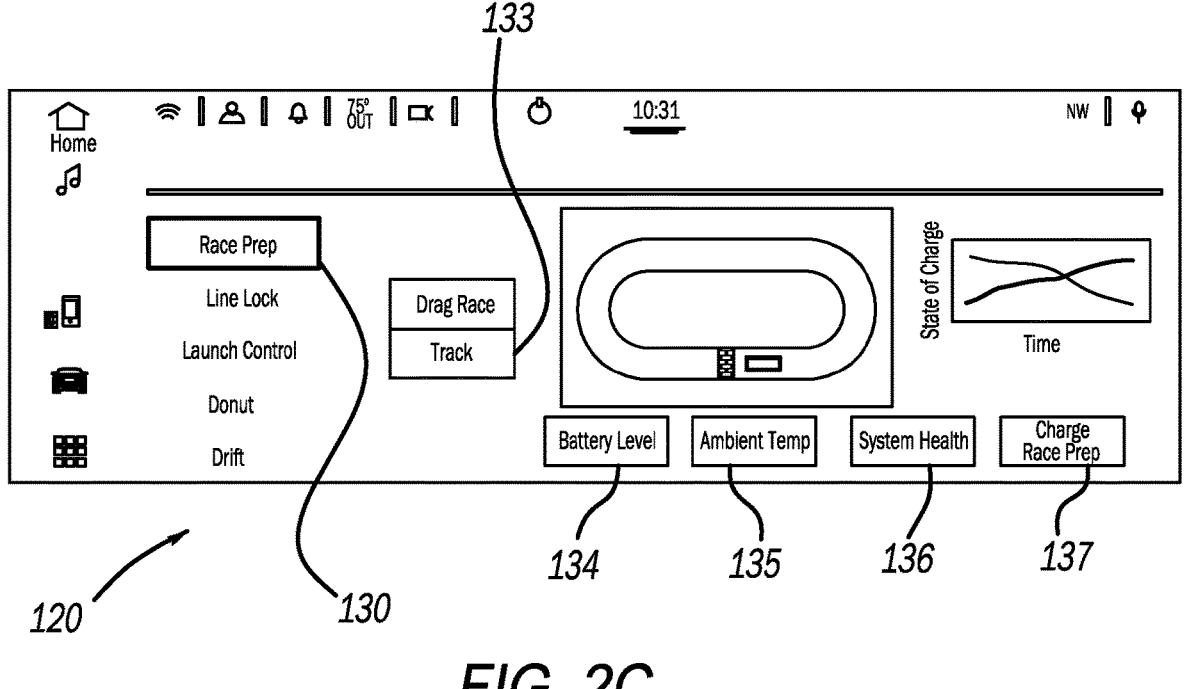

Referring now to FIGS. 2A-2C and with reference back to FIG. 1, an example menu sequence provided to the vehicle driver at the instrument panel cluster 40 will be described. At FIG. 2A, a first menu 110 displays performance pages 112, drive modes 114 and race options 116. As a result of a driver selecting race options 116 at the first menu 110, a second menu 120 (FIG. 2B) is displayed at the instrument panel cluster 40. The second menu 120 can include various race preparation modes including a drag race mode 132 (FIG. 2B), and a track mode 133 (FIG. 2C). The second menu 120 can additionally include various parameter displays including a battery level 134, an ambient temperature 135, and a system health 136. A cancel race preparation button 137 can also be included at the second menu 120. It is appreciated that the second menu can include additional parameter displays.

The vehicle system 10 conducts sequential steps to prepare the battery system 18 for the upcoming event. As a result of the driver selecting the drag race mode 132 at FIG. 2B, the vehicle system 10 performs steps to cool the battery system 18. As a result of the driver selecting the track mode 133, the vehicle system 10 performs steps to warm the battery system 18.

Figure 3:
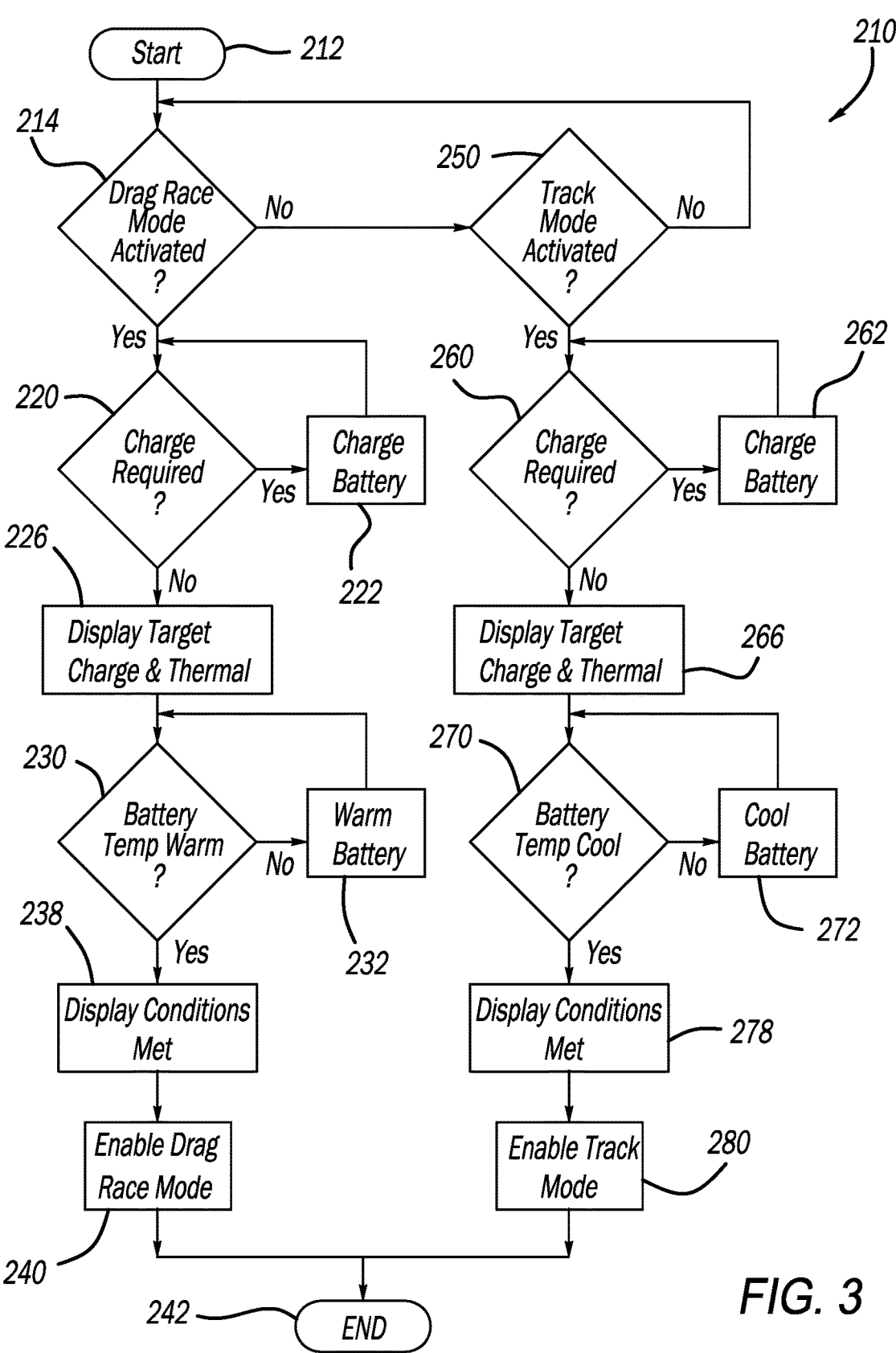
FIG. 3 is an example functional block diagram of a race preparation mode implemented by the exemplary controller of FIG. 1 according to the principles of the present disclosure.

Accordingly, systems and methods or techniques are provided for implementing the race preparation mode using the vehicle system 10. One example implementation of such race preparation mode technique is discussed below in connection with the exemplary flowchart 210 shown in FIG. 3.

With particular reference to FIG. 2, the exemplary methodology 210 for operating a race preparation mode in the vehicle system 10 will be described. The method 210 starts at 212 with confirmation that the race preparation mode has been activated/initiated. Again, the race preparation mode can be initiated such as by selection of the race preparation mode at menu 120 (FIG. 2B) on the drive interface 36 (see FIG. 1). If race preparation mode has been initiated at 214, control determines whether drag race mode has been activated. Drag race mode can be activated such as by selecting the drag race button 132 on the instrument cluster 40, such as shown at FIG. 2B. If drag race mode has been activated, control determines whether a battery charge is required at 220. If a battery charge is required, control communicates a message at 222, such as at battery level display 134, that a battery charge is required. Control loops to 220. If a battery charge is not required, control displays, at 226, a target charge and thermal indicators (see FIG. 2B).

At 230 control determines whether the battery system 18 is warm enough. In other words, control compares a temperature of the battery system 18 to a threshold satisfactory battery temperature suitable for a drag race event. If control determines that the battery system 18 is not at a threshold temperature, control warms the battery system 18 at 232. In examples, control can communicate a signal to the HVAC system 42 to warm the battery system 18. Additionally or alternatively, control can request a charge event (e.g., using the external charger 28). After warming the battery system 18 at 232, control loops to 226. If control determines that the battery system 18 is sufficiently warm at 230, control displays, at 238, a confirming message such as at the instrument panel menus that conditions are met. Drag race mode is enabled at 240. Control ends at 242.

If control determines that drag race mode has not been activated at 214, control determines whether track mode has been activated at 250. Track race mode can be activated such as by selecting the track button 134 on the instrument cluster 40, such as shown at FIG. 2C. If track mode has been activated at 250, control determines whether a battery charge is required at 260. If a battery charge is required, control communicates a message at 262, such as at battery level display 134, that a battery charge is required. Control loops to 260. If a battery charge is not required, control displays, at 266, a target charge and thermal indicators (see FIG. 2B).

At 270 control determines whether the battery system 18 is cool enough. In other words, control compares a temperature of the battery system 18 to a threshold satisfactory battery temperature suitable for a track event. If control determines that the battery system 18 is not at a threshold temperature, control cools the battery system 18 at 272. In examples, control can communicate a signal to the HVAC system 42 to cool the battery system 18. Additionally or alternatively, control can communicate a signal to the fan 43 to cool the battery system 18. After cooling the battery system 18 at 272, control loops to 266. If control determines that the battery system 18 is sufficiently cool at 270, control displays, at 278, a confirming message such as at the instrument panel menus that conditions are met. Track mode is enabled at 280. Control ends at 242.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle system for an electrified vehicle that implements a race preparation mode for preparing the electrified vehicle for a race event, the vehicle system comprising:

a motor that provides drive torque to drive wheels for propelling the vehicle;

a battery system that stores and delivers power to the motor;

an instrument panel cluster configured to display a user interface menu that includes a user selectable race preparation mode; and a controller that initiates the race preparation mode to prepare the electrified vehicle before the race event based on user selection of the race preparation mode, the race preparation mode including a drag race mode and a track mode, wherein the controller:

determines whether the drag race mode is selected;

determines, based on the drag race mode being selected, whether a measured temperature of the battery system is below a warm temperature threshold, suitable to enable the drag race mode;

elevates a temperature of the battery system based on the measured temperature being below the warm temperature threshold, the warm temperature threshold corresponding to a temperature suitable to enable the drag race mode;

determines whether the track mode is selected;

determines, based on the track mode being selected, whether a measured temperature of the battery system is below a cold temperature threshold, the cold temperature threshold corresponding to a temperature suitable to enable the track mode;

reduces a temperature of the battery system based on the measured temperature being above a cold temperature threshold;

determines whether the temperature of the battery system satisfies one of the warm and cold temperature thresholds; and enables one of the drag race mode and track mode based on a determination that the temperature of the battery system satisfies one of the warm and cold temperature thresholds.

2. The vehicle system of claim 1, wherein the vehicle system further comprises:

a heating cooling and air conditioning (HVAC) system that selectively provides one of heating and cooling to the vehicle system, wherein the controller communicates a signal to the HVAC system to warm the battery system based on a determination that the measured temperature of the battery system is below the warm temperature threshold.

3. The vehicle system of claim 1, wherein the vehicle system further comprises:

a heating cooling and air conditioning (HVAC) system that selectively provides one of heating and cooling to the vehicle system, wherein the controller communicates a signal to the HVAC system to cool the battery system based on a determination that the measured temperature of the battery system is above the cold temperature threshold.

4. The vehicle system of claim 1, wherein the vehicle system further comprises:

a fan configured to cool the battery system, wherein the controller communicates a signal to the fan to cool the battery system based on a determination that the measured temperature of the battery system is above the cold temperature threshold.

5. The vehicle system of claim 1, wherein the controller communicates a signal to the user interface menu to charge the battery system based on a determination that the measured temperature of the battery system is below the warm temperature threshold.

6. The vehicle system of claim 1, wherein the controller communicates a signal to the user interface menu that displays target charge and thermal parameters.

7. The vehicle system of claim 1, wherein the controller communicates a signal to the user interface menu that displays a time to ready indicative of a time needed to reach a desired temperature of the battery system.

8. The vehicle system of claim 1, wherein the instrument panel cluster renders graphics indicative of race preparation options, the race preparation options including a drag racing graphic and a track graphic displayed on the user interface menu.

9. A method for implementing a race preparation mode to prepare an electrified vehicle for a race event, the electrified vehicle including a user interface panel and a battery system that powers an electric motor, the method comprising:

determining that a race preparation mode has been selected, the race preparation mode including a drag race mode and a track mode;

determining whether the drag race mode is selected;

determining, based on the drag race mode being selected, whether a measured temperature of the battery system is below a warm temperature threshold, suitable to enable the drag race mode;

elevating a temperature of the battery system based on the measured temperature being below the warm temperature threshold, the warm temperature threshold corresponding to a temperature suitable to enable the drag race mode;

determining whether the track mode is selected;

determining, based on the track mode being selected, whether a measured temperature of the battery system is below a cold temperature threshold, the cold temperature threshold corresponding to a temperature suitable to enable the track mode;

reducing a temperature of the battery system based on the measured temperature being above a cold temperature threshold;

determining whether the temperature of the battery system satisfies one of the warm and cold temperature thresholds; and enabling one of the drag race mode and track mode based on a determination that the temperature of the battery system satisfies one of the warm and cold temperature thresholds.

10. The method of claim 9, wherein the electrified vehicle further comprises:

a heating cooling and air conditioning (HVAC) system that selectively provides one of heating and cooling to the vehicle system, wherein the method further comprises:

communicating a signal to the HVAC system to warm the battery system based on a determination that the measured temperature of the battery system is below the warm temperature threshold.

11. The method of claim 9, wherein the electrified vehicle further comprises:

a heating cooling and air conditioning (HVAC) system that selectively provides one of heating and cooling to the vehicle system, wherein the method further comprises:

communicating a signal to the HVAC system to cool the battery system based on a determination that the measured temperature of the battery system is above the cold temperature threshold.

12. The method of claim 9, wherein the electrified vehicle further comprises:

a fan configured to cool the battery system, wherein the method further comprises:

communicating a signal to the fan to cool the battery system based on a determination that the measured temperature of the battery system is above the cold temperature threshold.

13. The method of claim 9, further comprising:

communicating a signal to the user interface menu to charge the battery system based on a determination that the measured temperature of the battery system is below the warm temperature threshold.

14. The method of claim 9, further comprising:

communicating a signal to the user interface menu that displays target charge and thermal parameters.

15. The method of claim 9, further comprising:

communicating a signal to the user interface menu that displays a time to ready indicative of a time needed to reach a desired temperature of the battery system.

16. The method of claim 9, further comprising displaying, on a user interface menu of an instrument panel cluster, graphics indicative of race preparation options, the race preparation options including a drag racing graphic and a track graphic.

* * * * *